US006493218B1

(12) United States Patent
Fraga et al.

(10) Patent No.: US 6,493,218 B1
(45) Date of Patent: Dec. 10, 2002

(54) PALM REST WITH NUMERICAL KEYPAD

(75) Inventors: Johnny C. Fraga, Round Rock; Cassius J. Mullen, Georgetown, both of TX (US)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 09/715,247

(22) Filed: Nov. 17, 2000

(51) Int. Cl.[7] .................................. G06F 1/16
(52) U.S. Cl. .................. 361/683; 361/680; 361/686
(58) Field of Search ................. 361/679, 680, 361/683, 686

(56) References Cited

U.S. PATENT DOCUMENTS

| 5,596,481 | A | | 1/1997 | Liu et al. |
| 5,724,224 | A | | 3/1998 | Howell et al. |
| 6,040,977 | A | * | 3/2000 | Hoffer ......................... 361/680 |
| 6,262,716 | B1 | * | 7/2001 | Raasch ......................... 345/168 |

* cited by examiner

Primary Examiner—Darren Schuberg
Assistant Examiner—Yean-Hsi Chang
(74) Attorney, Agent, or Firm—Haynes and Boone, LLP

(57) ABSTRACT

A computer includes a base having an exterior surface and a keyboard including input components mounted on a portion of the exterior surface. A palm rest area is provided adjacent the keyboard. A palm rest component is detachably mounted in the palm rest area. A numerical keypad is mounted in the palm rest component. A coupling connects the numerical keypad to supplement the input components of the keyboard.

20 Claims, 3 Drawing Sheets

PALM REST WITH NUMERICAL KEYPAD

BACKGROUND

The disclosures herein relate generally to computer systems and more particularly to a control pad provided in a palm rest.

Portable computer keyboards include alphabetical and numerical key functions. However, due to space restrictions, the numerical key functions are integrated into the rows of keys in the same format as the alphabetical key functions.

On larger keyboards, such as those used with desktop computers, the numerical key functions are separated from the alphabetical key functions in a numerical keypad layout such as that used on a touch dial of a telephone. This is advantageous because the numerical key array is familiar and can be used with one hand. Also, when a separate numerical keypad is available, it is not necessary to activate a function key as it is when using a portable computer keyboard.

Therefore, what is needed is a full-size keyboard for a portable computer including a numerical keypad. This feature greatly speeds up data entry, especially for accounting and drafting applications.

SUMMARY

One embodiment, accordingly, provides a portable computer including full size keyboard functions having a numerical keypad. To this end, a portable computer includes a base having an exterior surface and a keyboard including input components mounted on a portion of the exterior surface. A palm rest area is provided adjacent the keyboard. A palm rest component is detachably mounted in the palm rest area. A numerical keypad is mounted in the palm rest component. A coupling connects the numerical keypad to supplement the input components of the keyboard.

A principal advantage of this embodiment is that no function key actuation is required, one handed operation is facilitated, and a numerical keypad layout is provided for faster data entry.

DETAILED DESCRIPTION

Figure 1:
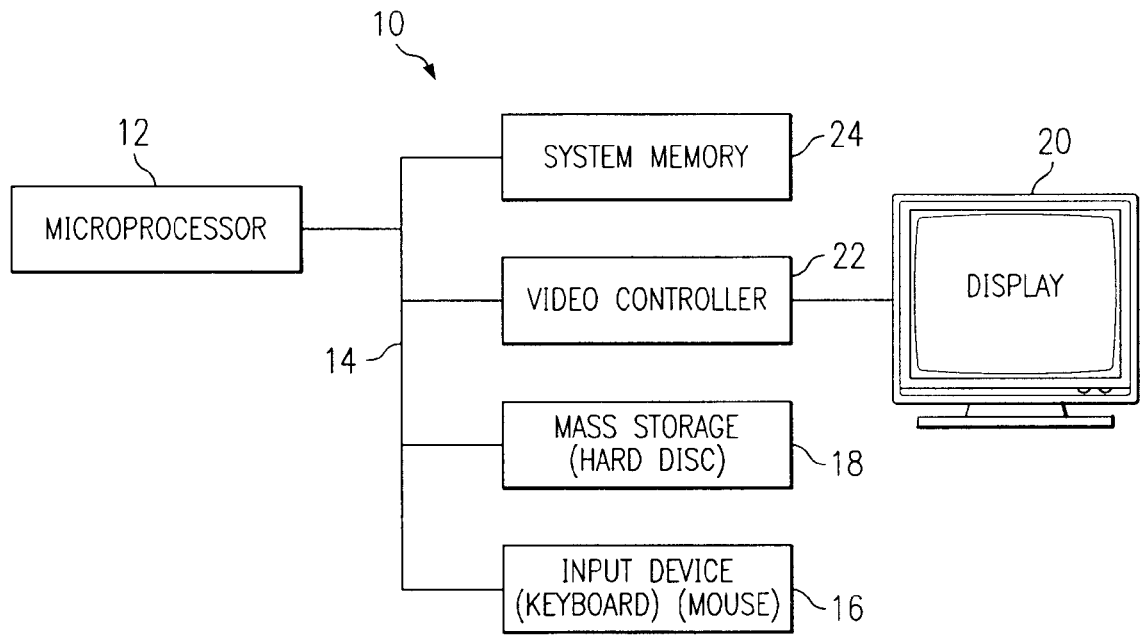
FIG. 1 is diagrammatic view illustrating an embodiment of a computer system.

In one embodiment, computer system 10, FIG. 1, includes a microprocessor 12, which is connected to a bus 14. Bus 14 serves as a connection between microprocessor 12 and other components of computer system 10. An input system 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
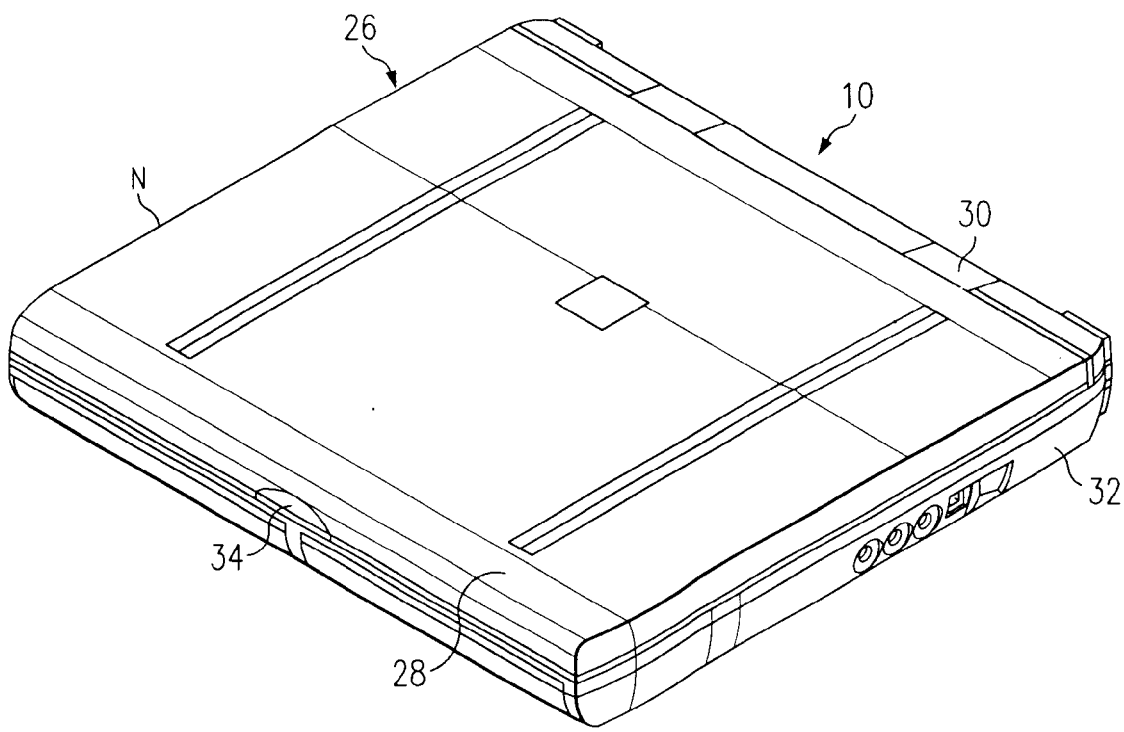
FIG. 2 is a perspective view illustrating an embodiment of a portable laptop computer having a lid in a closed position.
Figure 3:
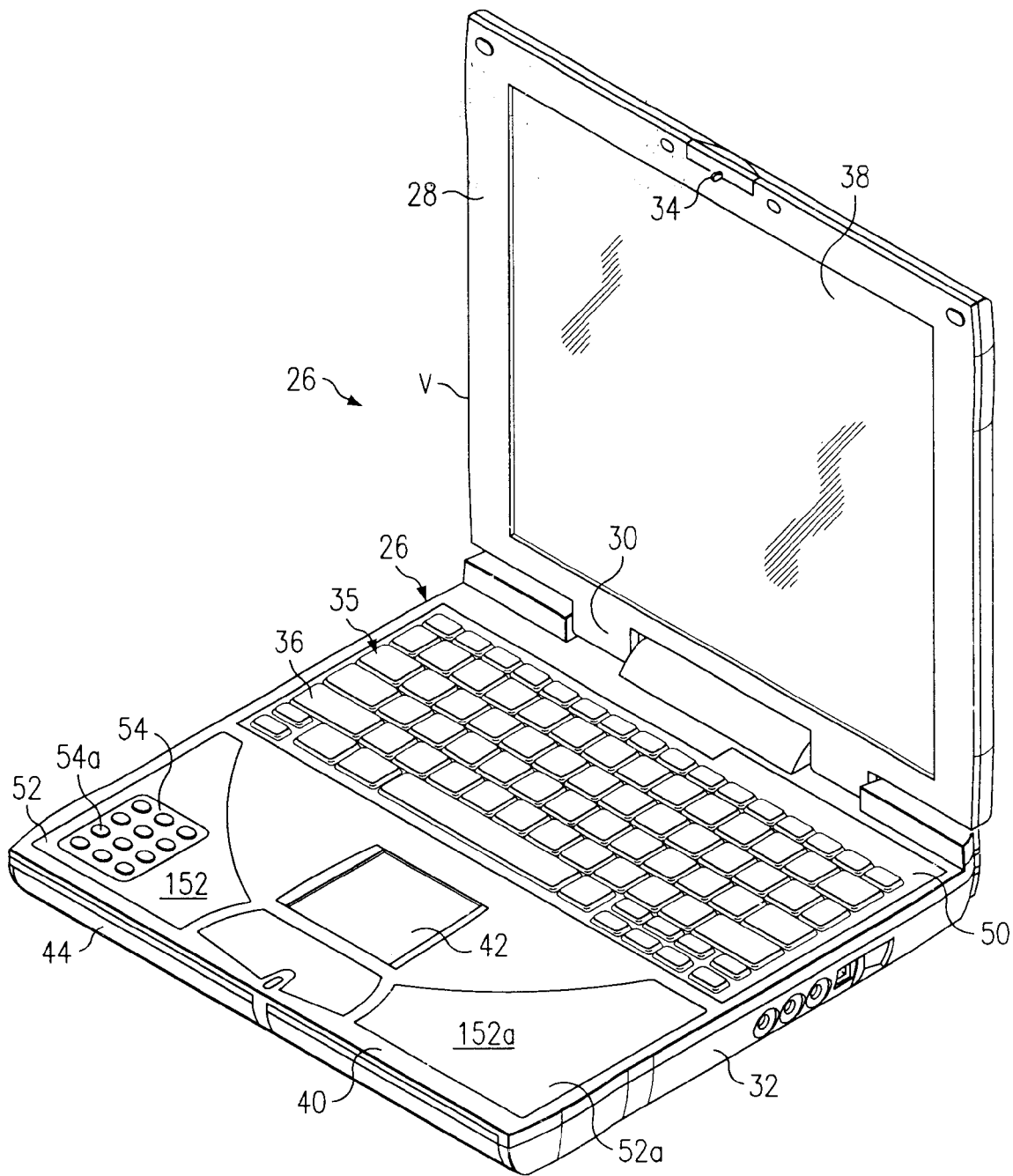
FIG. 3 is a perspective view illustrating an embodiment of a portable laptop computer having the lid in an open position.

Referring to FIG. 2, illustrated is a portable, notebook size computer designated 26 comprising a self-contained system, such as that illustrated at 10 in FIG. 1, and including a hinged top or lid 28 rotable about a hinge or hinges 30 from a nested position, "N," with a horizontal chassis base 32, to a substantially vertical or open position "V," FIG. 3. Opening of the notebook style portable computer by manipulation of a latch 34, reveals a plurality of input components such as a keyboard 35 of keys 36 on base 32, and a monitor screen 38 mounted in lid or top 28. Base 32 includes a palm or wrist rest area 40 including an input area 42 of the input system 16 positioned above a battery housing 44 and adjacent keys 36. Base 32 includes an exterior surface 50. The keyboard keys 36 and also the adjacent palm rest area 40 are provided on the exterior surface 50.

Computer 26, includes the palm rest area 40 adjacent the keys 36 of the main keyboard 35. A palm rest component 52 is detachably mounted in the palm rest area 40. A numerical keypad 54, including a plurality of keys 54a, is mounted in the palm rest component 52. Another palm rest component 52a may be provided in the palm rest area 40. The numerical keypad 54 may be provided in either palm rest component 52 or 52a as configured by a customer for preferred right-handed or left-handed use.

The exterior surface 50 of the computer 26 is formed of a plastic or metal material of a certain commercial color and texture, such as black, gray or charcoal. The palm rest components 52, 52a may be formed of the same material and color as the exterior surface 50, but are preferably formed of a different material having a more ergonomically pleasing texture, i.e. foam, gel filled, rubber, leather, vinyl, etc. and a more aesthetically pleasing color. The aspects of color and texture may be customer configured by customer specified order.

Each palm rest component 52, 52a includes an exterior surface 152, 152a, which may be of a material, color and texture to either match or contrast with the material, color and texture of exterior surface 50. The numerical keypad 54 is mounted in the palm rest component 52 or 52a so that the numerical keys 54a of keypad 54 are substantially flush with exterior surface 152 or 152a.

Figure 4:
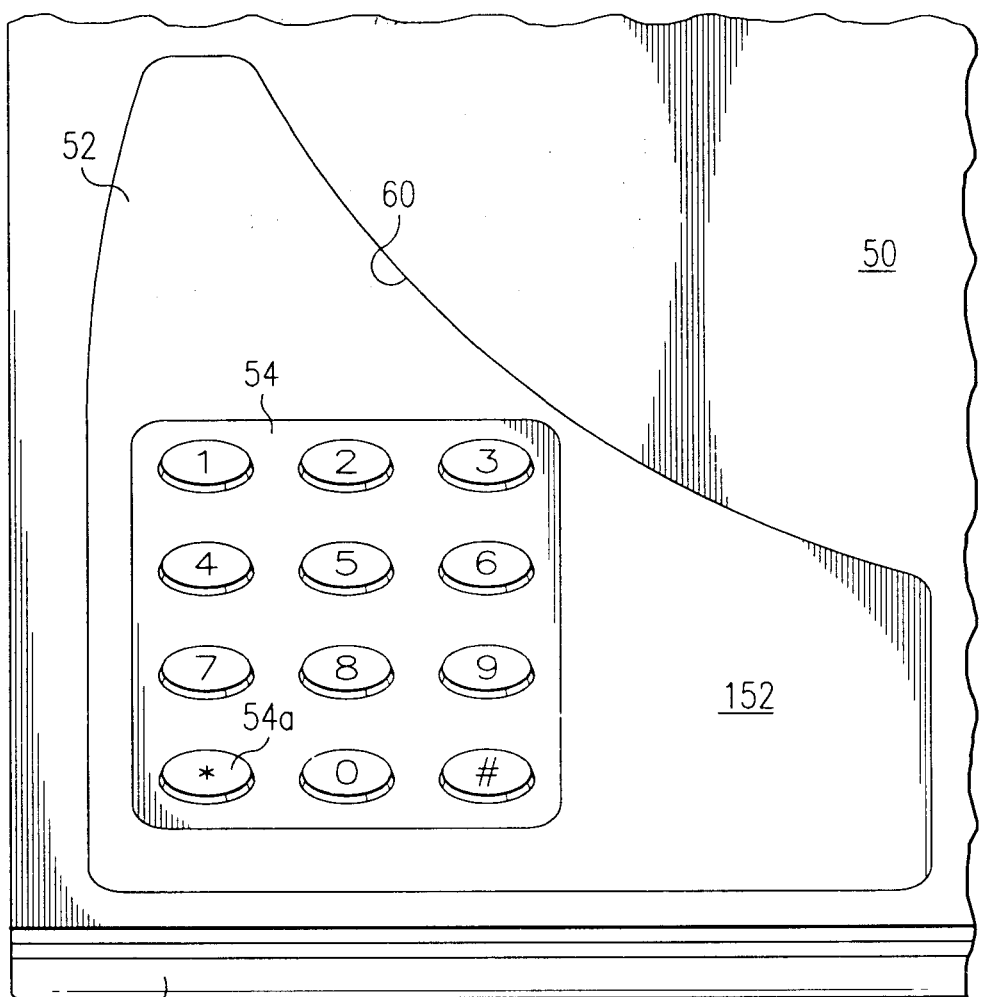
FIG. 4 is a perspective view illustrating an embodiment of a numerical keypad mounted in a palm rest component.

In the embodiment of FIG. 3, for example, the numerical keypad 54 is in palm rest component 52. The exterior surface 152 of component 52 may be foam filled and covered in a red vinyl surrounding the keypad 54. Also, the exterior surface 152a of component 52a may be a matching foam filled, red vinyl covered component. A more detailed view of component 52 is illustrated in FIG. 4. Such an arrangement provides material, color and texture differences between exterior surface 50 and surface 152.

Figure 5:
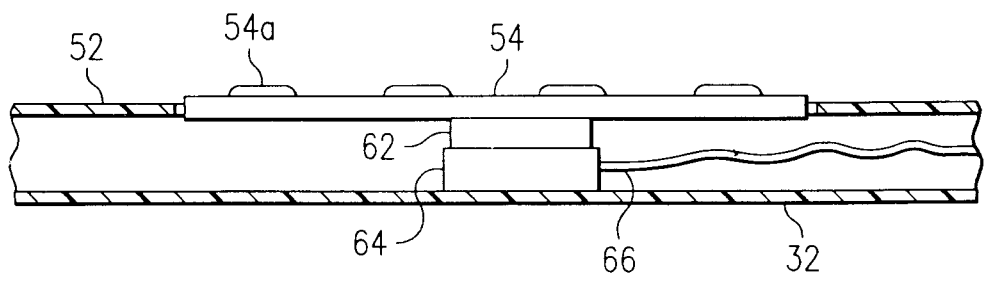
FIG. 5 is a cross-sectional view illustrating an embodiment of a palm rest component connector scheme.

Palm rest components 52, 52a, may be detachably snapped into a recess 60 formed in surface 50 of base 32. A connector 62, FIG. 5, is mounted on numerical keypad 54 and a mating connector 64 is mounted in base 32. A flex circuit member 66 is connected to extend from connector 64 to a keyboard controller chip (not shown) commonly mounted in the portable computer base 32 and coupled to keys 36. Also, the connector 62 can connect directly to a connector on an associated motherboard (not shown) which is mounted in base 32 for appropriate interface with keys 36.

In operation, normal operation of keyboard 35 is carried out with a user's hands supported by palm rest area 40. Use of numerical keys 54a of the numerical keypad 54 may be accomplished by the user's right or left hand, depending on the customer prescribed configuration, and without the need for actuating a function key on keyboard 35.

As can be seen, the principal advantages of these embodiments are that the numerical keypad is integrated into the palm rest of a portable computer to supplement the keyboard mounted in the base. No function key actuation is required and one handed operation is facilitated. The keypad includes a numerical keypad array for faster data entry.

Although illustrative embodiments have been shown and described, a wide range of modification, change and substitution is contemplated in the foregoing disclosure and in some instances, some features of the embodients may be employed without a corresponding use of other features. Accordingly, it is appropriate that the appended claims be construed broadly and in a manner consistent with the scope of the embodiments disclosed herein.

What is claimed is:

1. A computer comprising:
   a base having an exterior surface;
   a keyboard including input components mounted on a portion of the exterior surface;
   a palm rest area adjacent the keyboard;
   a first palm rest component detachably mounted in a first position on the palm rest area;
   a second palm rest component detachably mounted in a second position on the palm rest area spaced apart from the first position;
   a numerical keypad mounted in the first palm rest component; and
   a coupling for connecting the numerical keypad to supplement the input components of the keyboard.

2. The computer defined in claim 1 wherein the coupling includes a connector mounted on the first palm rest component and a mating connector mounted in the base.

3. The computer as defined in claim 1 wherein each palm rest component includes an exterior surface.

4. The computer as defined in claim 3 wherein the exterior surface of the base is formed of a first material and the exterior surface of each palm rest component is formed of a second material, different from the first material.

5. The computer as defined in claim 3 wherein the exterior surface of the base is formed of a first material having a first color and first texture, and the exterior surface of each palm rest component is formed of a second material, different from the first material and having a second color and a second texture, different from the first color and the first texture.

6. The computer as defined in claim 3 wherein the exterior surface of the base is formed of a first material having a first texture, and the exterior surface of each component palm rest is formed of a second material, different from the first material, and having a second texture, different from the first texture.

7. The computer as defined in claim 1 wherein the first palm rest component included an exterior surface adjacent the numerical keypad.

8. The computer as defined in claim 7 wherein the exteriour surface of the base is formed of a first material and the exterior surface of the first palm rest component is formed of a second material, different from the first material.

9. The computer as defined in claim 7 wherein the exterior surface of the base is formed of a first material having a first color and a first texture, and the exterior surface of the first palm rest component is formed of a second material, different from the first material, and having a second color and a second texture, different from the first color and the first texture.

10. The computer as defined in claim 7 wherein in the exterior surface of the base is formed of a first material having a first texture, and the exterior surface of the first palm rest component is formed of a second material, different from the first material, and having a second texture, different from the first texture.

11. A computer system comprising:
    a chassis having an exterior surface;
    a microprocessor mounted in the chassis;
    a storage coupled to the microprocessor;
    a video controller coupled to the microprocessor;
    a memory coupled to provide storage to facilitate execution of computer programs by the microprocessor;
    a keyboard including input components mounted on a portion of the exterior surface;
    a palm rest area adjacent the keyboard;
    a first palm rest component detachably mounted in a first position on the palm rest area;
    a second palm rest component detachably mounted in a second position on the palm rest area spaced apart from the first position;
    a numerical keypad mounted in the first palm rest component; and
    a coupling for connecting the numerical keypad to supplement the input component of the keyboard.

12. The computer system as defined in claim 11 wherein the coupling includes a connector mounted on the first palm rest component and a mating connector mounted on the base.

13. A customer configured portable computer comprising:
    a base having an exterior surface;
    a keyboard including input components mounted on a portion of the exterior surface;
    a palm rest area adjacent the keyboard;
    a customer configured first palm rest component detachably mounted in a first position on the palm rest area;
    a customer configured second palm rest component detachably mounted in a second position on the palm rest area spaced apart from the first position;
    a customer configured numerical keypad mounted in the first palm rest component; and
    a coupling for connecting the numerical keypad to supplement the input components of the keyboard.

14. The computer as defined in claim 13 wherein the first palm rest component includes an exterior surface adjacent the numerical keypad.

15. The computer as defined in claim 14 wherein the exterior surface of the base is formed of a first material and the exterior surface of the first palm rest component is formed of a second material, different from the first material.

16. The computer as defined in claim 14 wherein the exterior surface of the base is formed of a first material having a first color, and the exterior surface of the first palm rest component is formed of a second material, different from the first material, and having a second color, different from the first color.

17. The computer as defined in claim 14 wherein the exterior surface of the base is formed of a first material having a first texture, and the exterior surface of the first palm rest component is formed of a second material, different from the first material, and having a second texture, different from the first texture.

18. A method of providing numerical controls for a portable computer comprising:

forming a base having an exterior surface;

mounting a keyboard on a portion of the exterior surface, the keyboard including input components;

providing a palm rest area adjacent the keyboard;

detachably mounting a first palm rest component in a first position on the palm rest area;

detachably mounting a second palm rest component in a second position on the palm rest area spaced apart from the first position; and mounting a numerical keypad in the first palm rest component.

19. The method as defined in claim 18 wherein the numerical keypad is customer configured.

20. The method as defined in claim 19 further comprising coupling the numerical keypad to supplement the input components of the keyboard.

* * * * *